(12) United States Patent
Nuss et al.

(10) Patent No.: US 9,332,458 B2
(45) Date of Patent: May 3, 2016

(54) SYSTEM AND METHOD FOR OPTIMIZING PERFORMANCE OF A COMMUNICATION NETWORK

(71) Applicant: Intucell Ltd., Ra'anana (IL)

(72) Inventors: Ziv Nuss, Tzur Yigal (IL); Rani Wellingstein, Kefar Saba (IL); Jonatan Bien, Tel Aviv (IL); Ido Susan, Herzeliya (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/386,773

(22) PCT Filed: Mar. 20, 2013

(86) PCT No.: PCT/IL2013/050269
§ 371 (c)(1),
(2) Date: Sep. 19, 2014

(87) PCT Pub. No.: WO2013/144950
PCT Pub. Date: Oct. 3, 2013

(65) Prior Publication Data
US 2015/0087325 A1     Mar. 26, 2015

Related U.S. Application Data

(60) Provisional application No. 61/615,298, filed on Mar. 25, 2012.

(51) Int. Cl.
*H04W 72/00*     (2009.01)
*H04W 28/08*     (2009.01)
*H04W 24/02*     (2009.01)
*H04W 16/18*     (2009.01)
*H04W 16/22*     (2009.01)
*H04W 36/22*     (2009.01)

(52) U.S. Cl.
CPC .............. *H04W 28/08* (2013.01); *H04W 16/18* (2013.01); *H04W 16/22* (2013.01); *H04W 24/02* (2013.01); *H04W 36/22* (2013.01)

(58) Field of Classification Search
None
See application file for complete search history.

(56) References Cited

U.S. PATENT DOCUMENTS

| 6,141,565 A | 10/2000 | Feuerstein et al. |
| 7,151,937 B2 | 12/2006 | Jin et al. |

(Continued)

FOREIGN PATENT DOCUMENTS

| CN | 104684052 A | 6/2015 |
| EP | 1322048 | 6/2003 |

(Continued)

OTHER PUBLICATIONS

PCT Jul. 16, 2013 International Search Report and Written Opinion from International Application PCT/IL2013/050269, 3 pages.

(Continued)

*Primary Examiner* — Adolf Dsouza
(74) *Attorney, Agent, or Firm* — Patent Capital Group

(57) ABSTRACT

A communication apparatus and method are provided for predicting effects of changes in at least one radio network parameter on a cellular network which comprises a processor which is adapted to: (a) select a source cell in a cellular network; (b) select from among a first plurality of cells being neighbors of that source cell, a second plurality of neighboring cells and define a reference cluster that includes the source cell and the second plurality of cells; and (c) use the reference cluster to predict the effects of carrying out one or more changes in at least one radio network parameter on at least one network performance indicator of the reference cluster, and based on that prediction, establishing an expected impact of the one or more changes in the at least one radio network parameter on a cellular network performance.

20 Claims, 12 Drawing Sheets

(56) References Cited

U.S. PATENT DOCUMENTS

| | | |
|---|---|---|
| 7,379,739 B2 | 5/2008 | Rajkotia et al. |
| 7,884,763 B2 | 2/2011 | Na et al. |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,170,544 B1 | 5/2012 | Satapathy et al. |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 * | 3/2015 | Ryan .......... H04W 24/02 455/422.1 |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 2004/0085909 A1 | 5/2004 | Soliman |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0229087 A1 | 10/2006 | Davis et al. |
| 2007/0008885 A1 | 1/2007 | Bonner |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 * | 2/2009 | Kylvaja .......... H04L 41/0823 455/418 |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang Kai et al. |
| 2009/0323530 A1 | 12/2009 | Trigui et al. |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2011/0039539 A1 | 2/2011 | Maida et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0201277 A1 | 4/2011 | Eguchi |
| 2011/0110316 A1 | 5/2011 | Chen et al. |
| 2011/0128862 A1 * | 6/2011 | Kallin .......... H04W 36/22 370/245 |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0211514 A1 | 9/2011 | Hamalainin |
| 2011/0223964 A1 | 9/2011 | Ebiko |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marisco |
| 2012/0129537 A1 | 5/2012 | Liu et al. |
| 2012/0178451 A1 | 7/2012 | Kubota |
| 2012/0231797 A1 | 9/2012 | Van Phan et al. |
| 2012/0238263 A1 | 9/2012 | Caretti et al. |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226736 A1 | 8/2014 | Niu et al. |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |

| | | | |
|---|---|---|---|
| 2014/0274195 | A1 | 9/2014 | Singh |
| 2014/0293906 | A1 | 10/2014 | Chang et al. |
| 2014/0328277 | A1 | 11/2014 | Xiao et al. |
| 2014/0335909 | A1 | 11/2014 | Czerepinski |
| 2015/0011222 | A1 | 1/2015 | Brisebois et al. |
| 2015/0018028 | A1 | 1/2015 | Uplenchwar et al. |
| 2015/0038190 | A1 | 2/2015 | Carter et al. |
| 2015/0055479 | A1* | 2/2015 | Reider .................. H04W 36/22 370/236 |
| 2015/0063223 | A1 | 3/2015 | Shen |
| 2015/0063231 | A1 | 3/2015 | Seo et al. |
| 2015/0138981 | A1 | 5/2015 | Nuss et al. |
| 2015/0146594 | A1 | 5/2015 | Grayson et al. |
| 2015/0148036 | A1 | 5/2015 | Grayson et al. |
| 2015/0256314 | A1 | 9/2015 | Gauvreau et al. |
| 2015/0351072 | A1 | 12/2015 | Okmyanskiy et al. |

FOREIGN PATENT DOCUMENTS

| | | |
|---|---|---|
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/071308 | 5/2014 |
| WO | WO2014/087392 | 6/2014 |
| WO | WO2014/087393 | 6/2014 |

OTHER PUBLICATIONS

PCT Oct. 1, 2014 International Preliminary Report on Patentability from International Application PCT/IL2013/050269, 4 pages.
EPO Nov. 19, 2015 Extended Search Report and Written Opinion from European Application EP13767700; 9 pages.
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 —8.3.9 pp. 289-292; §8.5.21 pp. 357-365; §10.2.7 pp. 620-623; Annex B.3 pp. 2045-2052].
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 125 469 v11.2.0, Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.

"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.

"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.

"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.

"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.

"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.

"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.

"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.

"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.

"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.

"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.

"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.

"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.

"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.

"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.

"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0

Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Nov. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

"3GPP TS 36.413 V9.5.1 (Nov. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.

"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.

3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.

Adrangi, F., et al., "Chargeable User Identity," Network Working Group RFC 4372, Jan. 2006, 10 pages.

Andrews, Matthew, et al., "Optimal Utility Based Multi-User Throughput Allocation Subject to Throughput Constraints," IEEE INFOCOM 2005, Mar. 13-17, 2005, Miami, FL; 10 pages.

Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.

Basir, Adnan, "3GPP Long Term Evolution (LTE), ICIC and eICIC," posted Jun. 11, 2012; 5 pages; http://4g-lte-world-blogspot.com/2012/06/icic-and-eicic.html.

Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.

"Bisection Method," Wikipedia, the free encyclopedia, Aug. 26, 2015; 5 pages.

"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.

"Broadband Forum Technical Report: TR-069 CPE WAN Management Protocol," Issue: 1, Amendment 4, Issue Date: Jul. 2011 Protocol Version 1.3; © The Broadband Forum; 190 pages.

"Broadband Forum Technical Report: TR-069 CPE WAN Management Protocol," Issue: 1, Amendment 5, Issue Date: Nov. 2013 CWMP Version 1.4; © The Broadband Forum; 228 pages.

"Broadband Forum Technical Report: TR-196 Frmto Access Point Service Data Model," Issue: 2, Issue Date: Nov. 2011; 46 pages.

Calhoun, P., "Diameter Base Protocol," Network Working Group RFC 3488, Sep. 2003; 147 pages.

Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Cisco's One Platform Kit (onePK)," Networking Software (IOS & NX-OS), Cisco Systems, Inc., First published on or about Mar. 3, 2014; 2 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219,, 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
Goldsmith, A.J., et al., "Variable Rate Variable-Power MQAM for Fading Channels," IEEE Trans. on Comm. vol. 45, No. 10, Oct. 1997.
"GSMS LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto, University of Oulu, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.

Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," Iaroccasolutions Technology & Services, Feb. 2, 2015; 9 pages http://www.Iaroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012 http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON Wi Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.

"Paging Channel Selection," UMTS World; first published on or about Jun. 22, 2003; 3 pages http://www.umtsworld.com/technology/paging.html.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.

"PDCCH Processing," published by Gio Zakradze on Dec. 29, 2014; 56 pages.

"Plane (in networking)," Definition from WhatIs.com; Jan. 2013 http://whatis.techtarget.com/definition/plane-in-networking.

Piro, G., et al., "An LTE module for the ns-3 Network Simulator," in Proc. of Wns3 2011 (in conjunction with SimuTOOLS 2011), Mar. 2011, Barcelona Spain.

Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.

"Quadrature amplitude modulation," from Wikipedia, the free encyclopedia, Apr. 22, 2015; 11 pages.

"QoS Class Identifier," from Wikipedia, the free encyclopedia, Oct. 7, 2015.

"RADIUS," Wikipedia, the free encyclopedia, 12 pages [Retrieved and printed Oct. 11, 2013] http://en.wikipedia.org/wiki/RADIUS.

"Received signal strength indication," Wikipedia, the free encyclopedia, Dec. 22, 2014; 2 pages.

Rengarajan, Balaji, "A Semi-autonomous Algorithm for Self-organizing Dynamic Fractional Frequency Reuse on the Uplink of OFDMA Systems," Dec. 14, 2009; 22 pages.

"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.

Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.

Saad, Sawsan A., et al., "A Survey on Power Control Techniques in Femtocell Networks," Journal of Communications vol. 8, No. 12, Dec. 2013; 10 pages.

Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.

Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.

Seo, H., et al., "A proportional-fair power allocation scheme for fair and efficient multiuser OFDM systems," in Proc. of IEEE GLOBECOM, Dec. 2004, Dallas (USA).

Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.

Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.

Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.

Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.

Thapa, Chandra, et al., "Comparative Evaluation of Fractional Frequency Reuse (FFR) and Traditional Frequency Reuse in 3GPP-LTE Downlink," International Journal of Mobile Network Communications & Telematics (IJMNCT) vol. 2, No. 4, Aug. 2012; 8 pages.

"Transmission Time Interval," from Wikipedia, the free encyclopedia, May 2, 2013.

"TR-069 CPR WAN Management Protocol, Issue: 1 Amendment 5, Issue Date: Nov. 2013, CWMP Version: 1.4," Broadband Forum Technical Report; 228 pages.

"TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.

"TR-196 Femto Access Point Service Data Model, Issue: 2, Issue Date: Nov. 2011," Broadband Forum Technical Report; 46 pages.

UKIPO Mar. 27, 2012 Search Report from GB Patent Application Serial No. GB1120462.5.

UKIPO Jan. 19, 2013 Search Report from GB Patent Application Serial No. GB1120462.5.

UKIPO Dec. 20, 2013 Search Report from GB Application Serial No. GB1312321.1, 6 pages.

Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.

Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.

Wang, Jiao, "Dynamic Centralized Interference Coordination in Femto Cell Network with QoS Provision," Latest Trends on Communications, Proceedings of the 18th International Conference on Communications (Part of CSCC'14), Jul. 17-21, 2014; 6 pages.

Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.

"Whats is Uplink RSSI in LTE," TelecomSource thread, May 22, 2013; 5 pages http://www.telecomsource.net/howthread.php?5464-Whats-is-Uplink-RSSI-in-LTE.

Wubben, Dirk, et al., "Benefits and Impact of Cloud Computing on 5G Signal Processing," IEEE Signal Processing Magazine, Nov. 2014.

Xiong, Chao, "Enhanced ICIC for LTE-A HetNet," ZTE Corporation, LTE World Summit 2012, May 2012; 3 pages.

Zyren, Jim, "Overview of the 3GPP Long Term Evolution Physical Layer," White Paper, Freescale Semiconductor, Document No. 3GPPEvolutionWP; Jul. 2007; 27 pages.

EPO Jul. 29, 2014 Extended Search Report from European Application Serial No. EP13195673, 12 pages.

EPO Aug. 12, 2014 Extended EPO Search Report and Opinion from European Application Serial No. 13195780.8.

EPO Mar. 26, 2015 Extended Search Report and Opinion from European Application Serial No. EP14190541.

PCT Mar. 17, 2014 International Search Report and Written Opinion from International Application Serial No. PCT/IL2013/000086, 12 pages.

PCT Jun. 16, 2014 International Search Report and Written Opinion of the International Searching Authority for International Application Serial No. PCT/IL2013/000085.

PCT-Feb. 13, 2013 International Search Report and Written Opinion from International Application PCT/GB2012/052511; 28 pages.

U.S. Appl. No. 14/845,995, filed Sep. 4, 2015, entitled "Method and System for Dynamic Allocation of Resources in a Cellular Network," Inventors: Vladimir Yanover, et al.

U.S. Appl. No. 14/479,343, filed Sep. 7, 2014, entitled "Operation of Base Station in a Cellular Communications Network," Inventor: Simon Burley.

U.S. Appl. No. 14/818,084, filed Aug. 4, 2015 entitled "Resource Adaptation for Frequency Domain Downlink Inter-Cell Interference Coordination," Inventors: Ritesh K. Madan et al.

U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.

U.S. Appl. No. 14/811,580, filed Jul. 28, 2015 entitled "Determining Fractional Frequency Reuse Power Levels for Downlink Transmissions," Inventor: Ritesh K. Madan.

U.S. Appl. No. 14/816,957, filed Aug. 3, 2015 entitled "Selecting Cells for Downlink Inter-Cell Interference Coordination," Inventors: Rohit U. Nabar et al.

U.S. Appl. No. 14/816,990, filed Aug. 3, 2015 entitled "User Equipment Power Level Selection for Downlink Transmissions," Inventors: Vikram Chandrasekhar et al.

U.S. Appl. No. 14/679,868, filed Apr. 6, 2015, entitled "System and Method for Managing Interference in a Network Environment Based on User Presence," Inventors: Mark Grayson, et al.

U.S. Appl. No. 14/687,198, filed Apr. 15, 2015, entitled "System and Method for Managing Interference in a Network Environment Based on User Presence," Inventors: Mark Grayson, et al.

U.S. Appl. No. 14/686,598, filed Apr. 14, 2015, entitled "System and Method for Providing Uplink Inter Cell Interference Coordination in a Network Environment," Inventors: Ritesh K. Madan, et al.

U.S. Appl. No. 14/691,260, filed Apr. 20, 2015, entitled "System and Method for Providing Uplink Inter Cell Interference Coordination in a Network Environment," Inventors: Ritesh K. Madan, et al.

U.S. Appl. No. 14/809,201, filed Jul. 25, 2015, entitled "System and Method to Facilitate Small Cell Uplink Power Control in a Network Environment," Inventors: Ritesh K. Madan, et al.

U.S. Appl. No. 14/833,519, filed Aug. 24, 2015, entitled "System and Method to Facilitate Small Cell Uplink Powercontrol in a Network Environment," Inventors: Ritesh K. Madan, et al.

U.S. Appl. No. 14/918,420, filed Oct. 20, 2015, entitled "System and Method for Frequency and Time Domain Downlink Inter-Cell Interference Coordination," Inventors: Ritesh K. Madan, et al.

U.S. Appl. No. 14/951,987, filed Nov. 25, 2015, entitled "System and Method for Frequency and Time Domain Downlink Inter-Cell Interference Coordination," Inventors: Ritesh K. Madan, et al.

U.S. Appl. No. 14/803,475, filed Jul. 20, 2015, entitled "System and Method for Decoupling Long Term Evolution Media Access Control Scheduling From Subframe Rate Procedures," Inventors: Oliver James Bull et al.

U.S. Appl. No. 14/961,552, filed Dec. 7, 2015, entitled "System and Method to Provide Uplink Interference Coordination in a Network Environment," Inventor: Ritesh K. Madan.

* cited by examiner

SYSTEM AND METHOD FOR OPTIMIZING PERFORMANCE OF A COMMUNICATION NETWORK

CROSS-REFERENCE TO RELATED APPLICATIONS

This application is a national stage application under 35 U.S.C. §371 of PCT International Application Serial No. PCT/IL2013/050269, filed on 20 Mar. 2013 and entitled SYSTEM AND METHOD FOR OPTIMIZING PERFORMANCE OF A COMMUNICATION NETWORK, which application claims the benefit of priority to 61/615,298 filed on 25 Mar. 2012. The disclosures of the prior applications are considered part of and are hereby incorporated by reference in their entirety in the disclosure of this application.

TECHNICAL FIELD

The invention relates to a system and a method for managing wireless networks, and in particularly to a system and a method for predicting and optimizing a performance of a cellular communication network.

BACKGROUND

One of the major challenges which any cellular network operator faces is to ensure that the network is operating to its maximum efficiency. As a result, cellular network optimization is a major feature of many modern cellular networks.

In order to provide the best possible performance to the cellular network subscribers, the network is periodically optimized so that its resources can be more effectively utilized within the core network and/or the Radio Access Network ("RAN").

Typically, network optimization is affected by manually modifying network parameters in the Radio and Core Networks based on information that relates to network performance. Such information is retrieved periodically and analyzed by the Operations and Support System (OSS) to derive Key Performance Indicators (KPIs) therefrom. The state of the art KPIs include typical system level (e.g. related to user or cell throughputs) and link level (e.g. various transmission error rates) metrics.

Traditional optimization methods are slow, operate with a high degree of granularity, and have a long turnaround time. Optimization of a communication network using presently available tools basically entails changing one static parameter setup to another followed by several iterations of a cumbersome verification stage.

In order to support rapidly changing network needs, it would be highly beneficial to have a fully integrated automated load balancing application with a built in feedback mechanism, thereby freeing the operators from their tedious roles of manual optimization to software applications and focus on defining network policies, performance goals and network plans.

Several solutions have been proposed in the art for analyzing a wired/wireless communication network to optimize its performance.

US 2005064820 describes continuously collecting data from all elements constituting the communication network and analyzing the data to find an element of which performance and/or efficiency deteriorates.

US 2004085909 discloses scheduling transmissions in a wireless communication system using historical information and usage patterns of remote users in the system. Usage patterns for users within a system are stored and analyzed to optimize transmissions and resources in the system.

US 2010029282 describes collecting various wireless performance metrics by respective network access points as an aggregate measure of the wireless network performance. Aggregated data can be utilized to generate a performance model for the network and for individual access points. Changes to the data are updated to the model to provide a steady-state characterization of network performance. Wireless resources are generated for respective access points in a manner that optimizes wireless performance. Additionally, resource assignments can be updated at various intervals to re-optimize for existing wireless conditions, whether event driven or based on performance metrics. Accordingly, a robust and dynamic optimization is provided for wireless network resource provisioning that can accommodate heterogeneous access point networks in a changing topology.

US 20060068712 relates to a method of correlating probed data captured from various interfaces to create a combined picture at a call level. Thus, the method described allows real time distributed analysis and troubleshooting of the data on the interfaces of N radio network controllers from a single location.

US 20080139197 discloses providing a probe application by a network server for downloading by a mobile device. The probe application monitors a level of performance for various use applications provided by the network for the mobile device, and reports the monitored level of performance for at least one of the applications to the network server. The network server collates the performance data from the plurality of communication devices and provides resource allocation instructions to the mobile in order to optimize a level of performance for the use applications for the communication device.

Our co-pending application U.S. Ser. No. 13/680,779 filed Nov. 19, 2012 describes a computing platform for optimizing operation of a cellular network by: (a) probing for information exchanged between a mobile access network and a core network; (b) retrieving statistical KPIs generated by a plurality of network elements; (c) predicting a trend characterizing future performance of cells; and (d) triggering changes in the operation of the cellular network based on the predicted trend.

However, there is still a need for a solution that provides further optimization capabilities for operating cellular networks, such that can take into account traffic load effects by using a pre-selected cluster of cells and using parameter settings derived from such considerations, thereby enabling further optimization of the performance of a network under near real time conditions.

SUMMARY OF THE DISCLOSURE

The present invention addresses the shortcomings of the presently known methods by providing an automated solution for near real time optimization of wireless communication networks such as cellular networks as well as providing a solution for management of data bandwidth allocation.

Unless otherwise specified, all technical and scientific terms used herein have the same meaning as commonly understood by one of ordinary skill in the art to which this invention belongs. Methods, devices and systems similar or equivalent to those described herein can be used in the implementation or testing of the present invention.

Implementation of the method, apparatus and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

The disclosure may be summarized by referring to the appended claims.

It is an object of the present invention to provide a method and apparatus to enable managing traffic load in a cellular network by diverting traffic between adjacent wireless cells.

It is another object of the present invention to provide a method and apparatus to enable predicting the impact of offloading mobile users from one cell to another, upon the performance of the cellular network.

It is still another object of the present invention to provide a method and apparatus to enable diverting data traffic of mobile stations between wireless cells that belong to a predetermined cluster of cells.

It is yet another object of the present invention to provide a method and apparatus to enable diverting traffic of mobile stations between wireless cells that belong to a cluster of cells, based on analysis that was carried for a different cluster of cells.

Other objects of the present invention will become apparent from the following description.

According to a first aspect, there is provided a communication apparatus operative to predict effects of changes in at least one radio network parameter on a cellular network which comprises one or more processors adapted to:
(a) select a first cell (a.k.a. a source/main cell) in a cellular network;
(b) select from among a first plurality of cells being neighbors of said first cell, a second plurality of specific neighboring cells (preferably being communication-dependent on the first cell) and defining a reference cluster that includes the first cell and the second plurality of cells; and
(c) use the reference cluster to predict effects of carrying out one or more changes in at least one radio network parameter on at least one network performance indicator of said cluster, and based on that prediction, establish an expected impact of the one or more changes in the at least one radio network parameter on a cellular network performance.

It should be noted however, that the number of cells included in the first plurality of cells may be equal to or greater than the number of cells included in the second plurality of cells.

In accordance with another embodiment, the cells which are selected from among the first plurality of cells to belong to the second plurality of cells, if:
(i) a number of handovers carried out from the first cell to each of the selected second plurality of cells within a pre-defined period of time, divided by a total number of handovers carried out from the first cell to all of its neighboring cells belonging to the first plurality of cells within that pre-defined period of time exceeds a pre-defined threshold; and/or
(ii) a geographical distance extending between said first cell and each of the selected second plurality of cells is equal to or less than a predetermined value.

By yet another embodiment, the at least one radio network parameter being changed is offloading of communication traffic from the first cell to at least one cell from among the second plurality of cells.

According to still another embodiment, the at least one radio network parameter is a member of the group that consists of: antenna tilt, pilot power usage and/or handover hysteresis offset between the first cell and the second plurality of cells.

In accordance with another embodiment, the first cell is characterized by having radio resource utilization which exceeds a predetermined threshold.

By still another embodiment, the one or more processor are adapted to repeat (c) until the expected impact on the cellular network performance, of the one or more changes in the at least one radio network parameter, is maximized.

According to another embodiment, the at least one radio network parameter change leading to maximization of impact on the cellular network performance, is applied for optimizing cellular network performance associated with a second cluster.

By yet another embodiment, the communication apparatus is adapted for use in a process of balancing a traffic load of the cellular network, wherein the one or more processors are further adapted to:
(I) use the reference cluster to determine an effect of carrying out one or more changes in at least one radio network parameter on at least one network performance indicator of the reference cluster, and based on that determination, derive traffic load optimization rules for the cellular network; and
(II) obtain at least one network performance indicator which is associated with the cellular network and optimize load performance of the cellular network according to the at least one network performance indicator and the load optimization rules.

According to another aspect, a method is provided for predicting effects of changes in at least one radio network parameter on a cellular network, wherein the method comprises the steps of:
(a) selecting a first (source) cell in a cellular network;
(b) selecting from among a first plurality of cells being neighbors of the first cell, a second plurality of specific neighboring cells being communication-dependent on said first cell and establishing a reference cluster that includes the first cell and the second plurality of cells; and
(c) using the reference cluster established to predict effects of carrying out one or more changes in at least one radio network parameter on at least one network performance indicator of the reference cluster, and based on that prediction, establishing an expected impact of the one or more changes in the at least one radio network parameter on a cellular network performance.

According to another embodiment of this aspect, the method provided is used in a process of balancing traffic loads in the cellular network, and wherein the method further comprising the steps of:
(I) using the reference cluster to determine an effect of carrying out one or more changes in at least one radio network parameter on at least one network performance indicator of the reference cluster, and based on that determination, derive traffic load optimization rules for the cellular network; and
(II) obtaining at least one network performance indicator which is associated with the cellular network and optimize load performance of the cellular network according to the at least one network performance indicator and the load optimization rules.

By yet another embodiment, the method is used in managing data radio resources of a cellular network, wherein the method further comprising:
(a) retrieving information that relates to:
  (i) radio resource load conditions of a cell; and
  (ii) radio conditions for each user of that cell;
(b) identifying data-overloaded cells and correlating their associated information with that retrieved in (a); and
(c) ranking users of these cells according to their impact on radio load of the cell.

According to still another embodiment, the method further comprising:
(d) limiting data provisioning to specific users of the cell based on step (c) and subscriber information associated with these specific users.

It should be noted however, that even in case where no change in performed in any of the cells of the reference cluster, still, the invention should be understood to cover affecting changes at the source cell and impact the usage and loading pattern of cells in the area, in order to balance the load between the cells located in that area. This may in fact be regarded as being intra carrier spatial load balancing.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
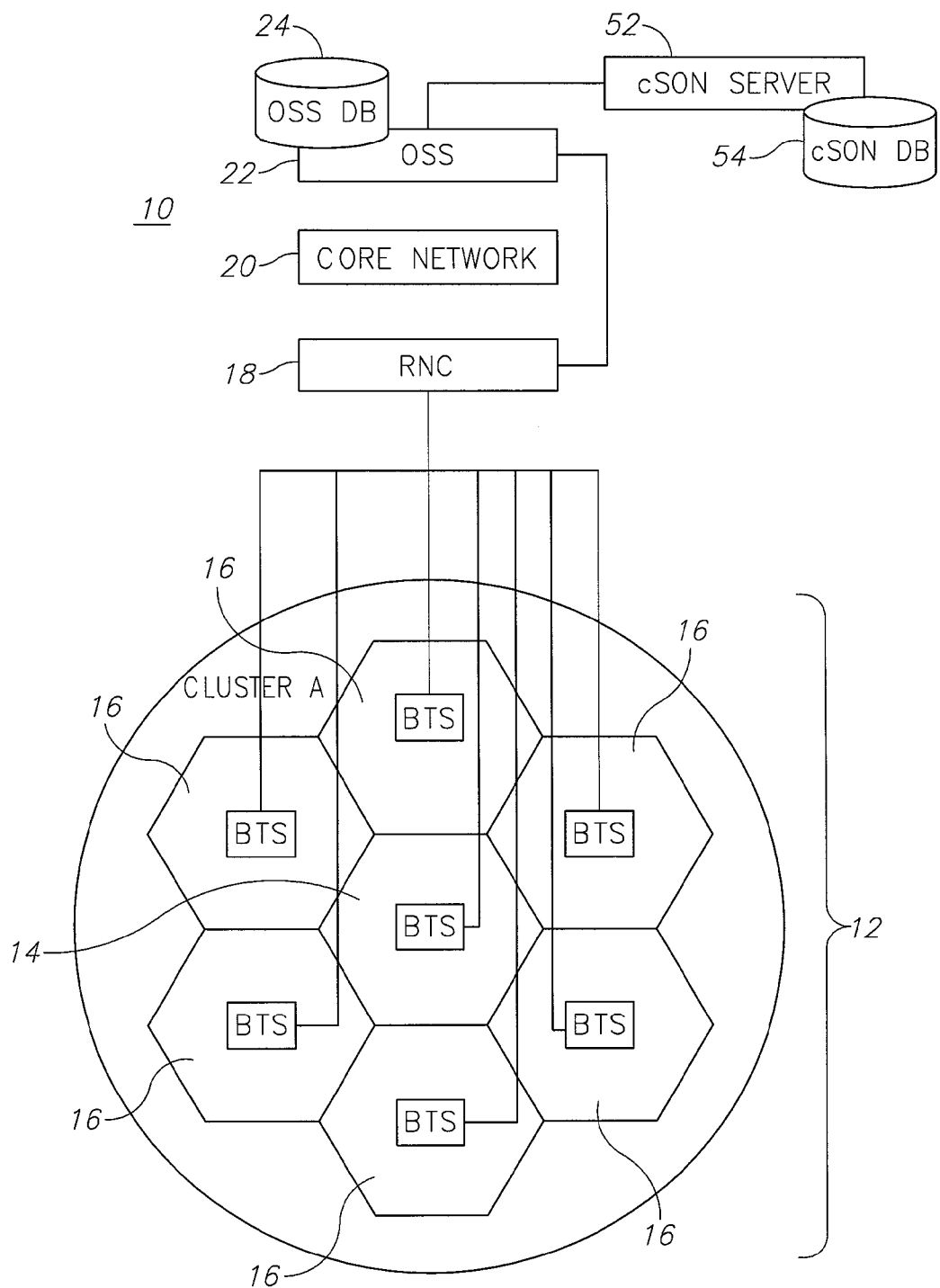
FIG. 1 illustrates a system that comprises a reference cells' cluster including a source cell and its cluster-specific neighboring cells and the radio network and optimization network (cSON) servers.

According to one embodiment, the present invention relates to a system which utilizes predefined rules for near real time optimization of a cellular network performance. Specifically, this embodiment of the present invention can be used to automate the task of network performance optimization and provide in near real time network performance gains in cells that are characterized by suboptimal performance as indicated by relevant KPIs.

The principles and implementation of the present invention may be better understood with reference to the drawings and accompanying descriptions.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Operators of cellular networks are facing nowadays an avalanche of demand, driven by the mobile data crunch—fast penetration of smartphones and mobile broadband. In order for them to support this increase in traffic, it requires to introduce proportional increase in resources, causing a linear increase in under-utilized resources.

Cellular networks have dynamic RF traffic patterns that change throughout the week, and over the course of a day. Such dynamic patterns result from changes in voice and data communication loads, geographical changes in the position of the user equipment (UE) and the like. Unexpected load imbalances due to massive gatherings, cell malfunction or introduction of new cells in an area all effect the load distribution, and have to be dealt with as soon as they occur.

In static networks with no time-sharing of resources, costly resources (e.g. cells) which can be used to support peak traffic are obviously often under-utilized. Although dimensioning rules dictate adding new cells or resources when peak capacity approaches saturation, the load in unbalanced networks is uneven, and hence dimensioning rules are not applicable.

On the other hand, leaving the cellular network in unbalanced status without expansion, will limit the data/voice capacity that can be made available to subscribers at peak times, and consequently lower subscribers' satisfaction leading to a possible loss of revenue.

Existing optimization solutions are affected through large time cycles. It might take days or even weeks to optimize a network. By their very nature, such solutions are suitable for long term or predicted load issues and not for dealing with immediate load imbalances.

Using decision-supporting software to perform the optimization calculations such as required expansions, RF parameter changes, and the predicted impact on performance, gives the radio engineers more optimization choices than using manual input. However, these tools provide reports—not actions, and are prone to error due to the high degree of sensitivity to initial conditions. The radio engineers are still left with the tasks of verifying the resulting recommendations, updating the cells configurations, and checking the results. This is an open-loop solution, where the entire end-to-end process still requires manual stages in order to complete it.

Some equipment vendors offer solutions of inter-frequency load balancing. These solutions can balance loads between carriers—generally co-sectors on the same pole.

These solutions, while efficient in resolving localized load imbalance cases, do not provide a solution for a load in a specific group of cells, require installation of infrastructure of multiple carriers, do not solve problems near the cells' edges and do not optimize the utilization of a single carrier layer.

For local areas with consistent capacity problems, operators can elect to offload the data portion to another layer such as Wi-Fi, LTE or small cells. However, in order to extract value from Wi-Fi offload mobile operators will require carrier-grade Wi-Fi networks that are tightly integrated into the operator's network and back office environments. In any case, such a solution can only add capacity to a fixed location, but does not provide a solution to congestion situations that change over time and place.

The above described solutions are not designed to be compatible with the degree and extent of usage variations, typically encountered in present day cellular networks and have practical limitations such as required handset support or multi vendor functional complexities.

To traverse these limitations of prior art optimization approaches, the present invention devised an automatic optimization solution (referred to herein as a self optimized network—SON) which can respond to demand patterns as they form and change.

The present invention relates among others to a method (e.g. carried out as an algorithm, referred to hereinafter as LB algorithm) which comprises the following steps:

(i) selecting a specific cell (typically a resource loaded cell) being a first cell and several of its neighbors (from among all its neighbors) and forming a cluster of cells where that specific cell is the main cell of the cluster;

(ii) changing radio network parameters of the cluster;

(iii) monitoring the effect of such changes on KPIs of the main (source) cell or cluster;

(iv) repeating steps (ii) and (iii) until resource loading of the main cell (or cluster) is decreased.

The results gained by following such a process can be applied to optimize performance of the same cluster following the cluster formation and at different time points (e.g. Example 3), as well as to optimize performance of an identical or similar cluster (or a main cell thereof).

As further described in the Examples section which follows, use of the SON system of the present invention can lead to dramatic improvement in overall network resources' utilization, reduction in the number of loaded cells and noticeable improvement in the end user QoE (Quality of Experience).

Thus, according to one embodiment of the present invention there is provided a system for monitoring the effect of changes in radio network parameter(s) on manageable resources of a communication network such as a cellular network (which can include WI-FI, 802.11a/b/g/n, GSM, UMTS, EVDO, LTE, LTE-A, WiMax 802.16e and others).

As used herein the terms "manageable resources" or "resources" refer to utilization (or over-utilization) of various network resources, including available transmission power of the base station power amplifier, baseband processing capacity available in the baseband hardware cards installed in the base station, available codes in the OVSF code tree in UMTS/CDMA technology, or available PRBs (Physical Resource Blocks) in LTE technology, or the accumulated uplink noise correlated to the carried traffic by the cell. Additional resources which can be affected and managed by the present invention include transmission (or backhaul) link to the base stations, RNC (Radio Network Controller) resources such as MP (Main Processor) load etc.

As used herein the terms "Radio Network Parameters" and "radio parameters" interchangeably refer to various parameters which can have an effect on the consumption and performance efficiency of the cellular network resources. Such parameters include both software and/or hardware radio parameters, e.g. CPICH power settings, vertical tilt angle settings, handover threshold settings, handover offsets between different cells, and the like.

Such radio parameters changes affect the network performance e.g. its ability to support voice and data communication with UEs, its power consumption, and all other network resources described above such as power usage, code usage, etc.

The system according to an embodiment of the present invention includes a computing platform (e.g. hardware running a dedicated software application, for example a standard HP Proliant G7 server running the software application) which is in communication with the OSS (Operation and Support System) of the network.

The computing platform is in communication with individual cells of the cellular network by direct connection to the network elements or through a mediation layer such as an OSS server connection and is capable of selecting a specific cell of a cellular network to be the first cell (a.k.a. source cell, main cell) according to one or more of the following criteria:

(i) Power usage of the cell exceeds a pre-defined threshold;

(ii) Code tree usage of the cell exceeds a pre-defined threshold;

(iii) Baseband hardware resources of the cell exceed a pre-defined threshold;

(iv) Transmission resources consumed by the cell exceed a pre-defined threshold;

(v) Number of CS and/or PS links supported by the cell exceeds a pre-defined threshold;

(vi) Number of HS (High Speed) links served by the cell exceeds a pre-defined threshold;

(vii) Number/Percent of rejected PS/CS/HS establishment attempts which are rejected by the Admission Control mechanism implemented by the RNC or by the cell itself, exceeds a pre-defined threshold.

(viii) Data Traffic payload to Voice traffic Erlang carried by the cell exceeds a pre-defined threshold.

Once such a source cell is selected, the computing platform selects from a list of its neighbors (i.e. a first plurality of cells), a number of specific neighbor cells (being a second plurality of cells selected from the first plurality of cells) that are dependent on that source cell in as far as communication capabilities, i.e. neighbor cells that are RF related to the source cell. The selected neighbor cells are preferably cells that are highly coupled from RF perspective to the source cell. In other words, they have substantial overlapping with the source cell. This may be expressed by the relative number of handover attempts between any destination cell to the source cell.

Selecting such specific neighbor cells may be done according to one or more of the following criteria:

(i) Cells that are defined as intra frequency neighbor cells to the source cell either in the management system or by the cell itself (for example in the case of LTE ANR mechanism); and/or (ii) A weighting function is implemented for the neighbor cells and certain neighbors are selected according to a weighting ranking algorithm. A possible weighting function may be the relative number of HO attempts (or successes) between any relation to the overall number of HO attempts (or successes) measured for the cell. Another possible weighting function may be for example the relative number of measurement reports from UEs under the domain of the source cell that report the specific neighbor cell as present in the Active Set (for CDMA technology) or as exceeding a certain signal strength threshold (for any type of technology). Once the source cell and the specific neighbors are selected, the computing platform establishes a monitored cluster (also referred to herein as reference cluster) which comprises one or more of the following combinations:

(i) the source cell and the specific neighbor cells;

(ii) the source cell and all of the cells being a first degree neighbors of the source cell; and (iii) the source cell and a combination of cells that comprises first and second degree neighbors, or Nth degree neighbor of the cell according to their calculated weight, such that the final weight calculated for any specific neighbor is above a predetermined threshold.

The cluster described above is monitored to identify effects of changes in the network parameter(s) on the operating performance within the cells belonging to the cluster being monitored or with the main cell of that cluster itself. The source cell/cluster performance can be measured either by retrieving values of KPIs collected from the OSS system, or by any other near real time means such as probe based calculated KPIs, to identify the impact of changes induced in the network parameter(s) on the cellular network. The relationship between the changes of the parameter(s) and KPIs may be used to establish a set of optimization rules which are applied to the cluster in a continuous fashion until a performance thereof or of its source cell is optimized.

Such optimization rules may include, but are not limited to, the following:

(i) change of CPICH (Common Pilot Channel) by $-\Delta_1 dB$ for the source cell, and $+\Delta_2$ dB for the selected neighbor cells;

(ii) change HO offset for the source cell by $-\Delta_1 dB$, and $+\Delta_2$ dB for the selected neighbor cells; and/or (iii) change tilt by $-\Delta_1°$ for the source cell and by $-\Delta_2°$ for the selected neighbor cells.

Some or all of the above optimization steps can be repeated in a predefined order, until the cause of source cell overutilization (loading), e.g. power load, falls below a threshold, or until performance degradation occurs. Once performance degradation is detected, the system reverts to the last change prior to that degradation. This is implemented using a feedback function which constantly monitors the reference cluster performances in terms of for example drop call rate, number of voice and data calls, HS payload and throughput. In addition, under-layer cells to the reference cluster cells may also be monitored, such as cells associated with another layer (e.g. GSM or another UMTS carrier) to confirm that no change in the KPI pattern has occurred in those under-layer cells.

A system for modeling and optimizing a communication network, which is referred to herein as system 10 is illustrated in FIG. 1.

System 10 includes a cluster of cells 12 which includes a source cell 14 and several (typically, between 4-6) neighbors' cells 16. The neighbors can have the same frequency as the source cell (referred to herein as "Intra cluster") or a different frequency (referred to herein as "Inter cluster"), or there may be cases where different technologies is implemented in one or more of the neighbor cells from that of the source cell (referred to herein as "iRAT cluster").

Each of cells 14 and 16 is in communication with the radio network controller 18 (RNC) or another equivalent mobility control entity, or OSS, or cSON server, in other technologies, which is in turn connected to the core network servers 20 and the OSS servers 22 which include an OSS database 24.

For a cSON server, all the coordination is carried out internally, since the cSON server is operative to control directly control all the cells in the network, and can have a centralized view of the KPI effect to any change in performance resulting from radio parameters' changes. In a non centralized configuration of SON, a communicating and coordinating function between SON functions which control subset of the network may be used, to allow site specific load balancing activities, and performance monitoring.

Figure 2:
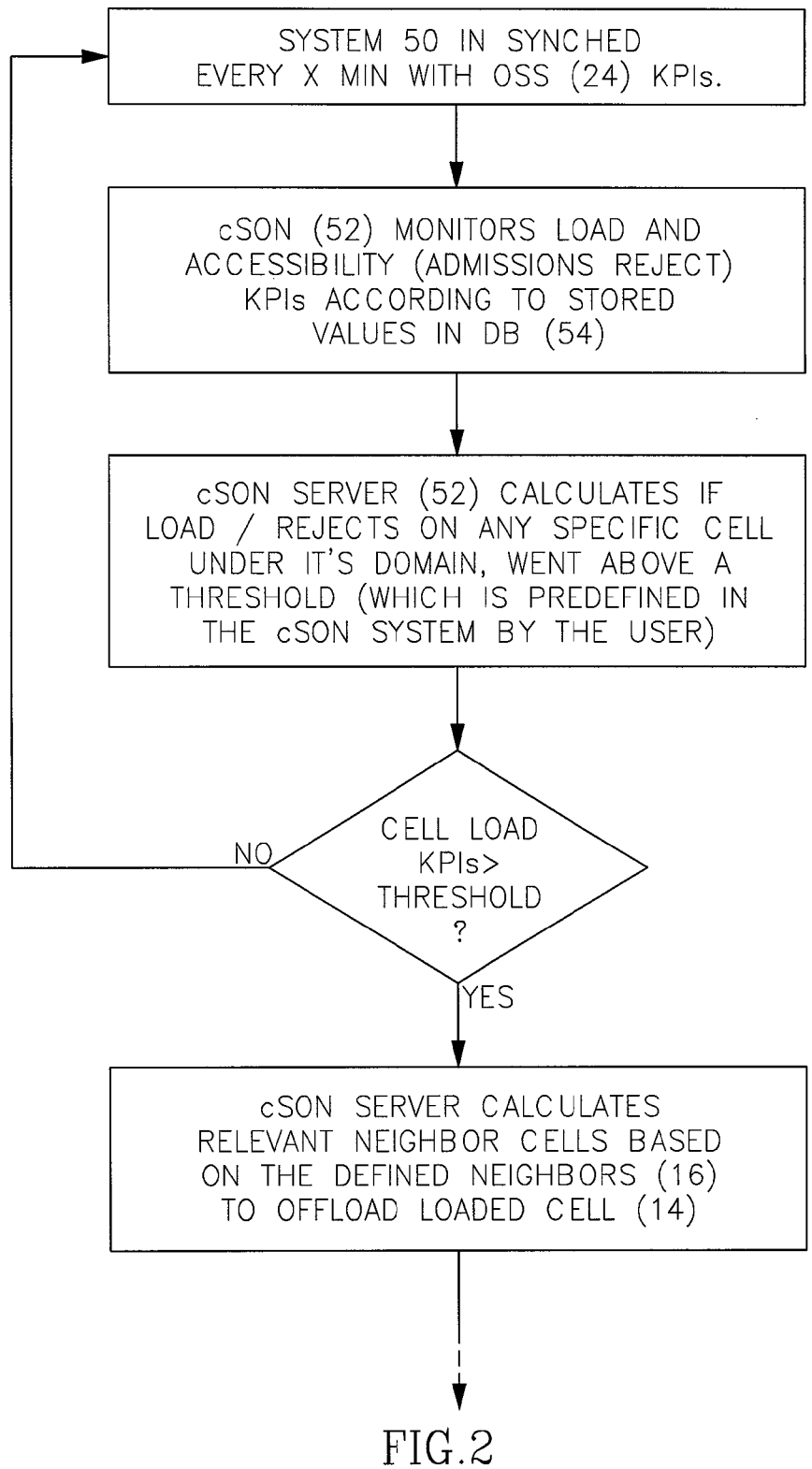
FIG. 2 is a flowchart outlining steps in the process of generating a reference cluster (A) and the use of specific rules in load balancing of traffic applied to a specific cluster (B)
Figure 2:
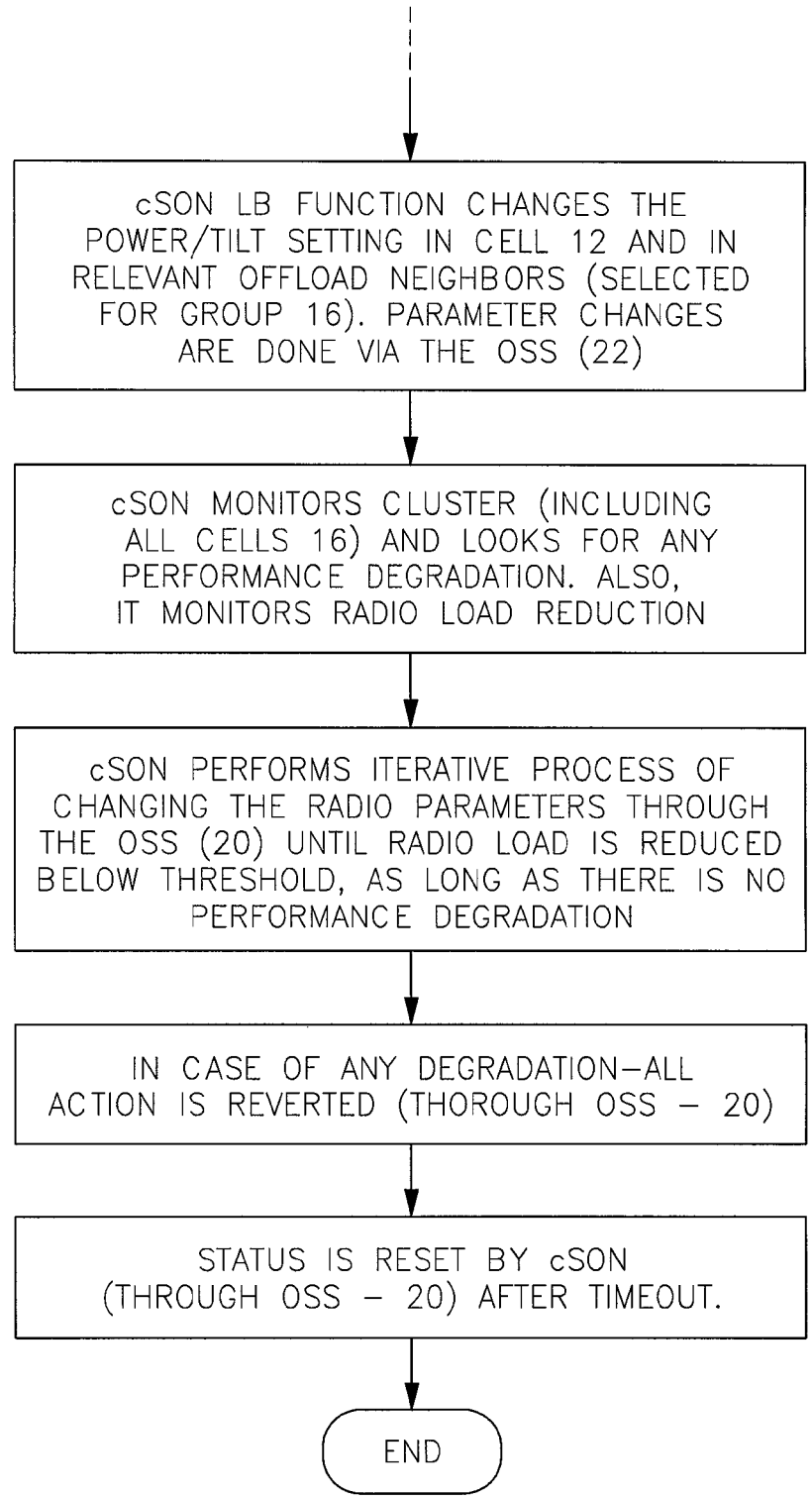

A flow chart illustrating a cluster setup is shown in FIG. 2 (steps 1-5). The present system (referred to as system 50—further described hereinbelow) is synchronized every several minutes (e.g. 3-10 minutes) with OSS 24 in order to obtain KPIs of the network (step 1). In step 2, the system monitors all cells of a network for load metrics (monitoring is implemented by applying specific load balancing (LB) algorithms which are executed by cSON server 52), thereafter congested cell (or cells) are identified by cSON 52 (step 3) based on load metrics. Such a congested cell will be determined to be the source cell. If no source cell is identified, system 50 reverts to step (step 4). The LB algorithm of the present invention then identifies the relevant offloading neighbor cells to the source cell and determines their loading status (step 5); the source cell and its offloading neighbors and then defined as the cluster to be monitored.

As mentioned hereinabove, such a cluster can be used for optimizing the performance of the source cell and/or of the cluster and/or a source cell belonging to an identical or similar cluster.

Thus, according to another aspect of the present invention there is provided a system for optimizing network performance in a cellular network.

System 50 illustrated in FIG. 1 includes an optimization server (cSON) 52 and database 54 communicating with OSS servers 22.

Load balancing optimization is based on constant KPI monitoring. Therefore, system 50 continuously extracts KPI values from the network (from the performance management database of OSS 20) and provides these KPI values to the SON application for analysis. A load balancing application executed by server 52 checks a list of load and admission control statistics (which are stored at cSON DB 54), and compares them to thresholds configured by cSON users (e.g. optimization engineers running the cSON system on a routine basis). When any of these thresholds are exceeded in any cell of the network, this cell is determined as a "source cell", cells (selected neighbor cells of the source cell) are added to a work list, and the application initiates re-balancing of network resources' consumption of users by means of RF shaping of the loaded cell and the surrounding cells. By fine tuning the settings of these thresholds, the operator can deal with load conditions even before the load can actually be felt by subscribers. The performance of the re-balancing process highly depends on the accuracy of the neighbor relation lists and on the configured time constants of the application.

System 50 provides a near-real time response (typically minutes) to the rapidly changing and unpredictable load demands imposed on the network. The Load Balancing application of server 52 modifies the RF footprint of the loaded and surrounding cells to fit the current usage demand and match the subscriber distribution to the available resources. Using RF shaping increases the efficiency of the network, and increases the utilization of existing resources.

The Load balancing application of server 52 determines the RF parameters for the loaded cell and its neighboring cells based on the KPI and PM data collected from the OSS.

In order to ensure that RF shaping may indeed be carried out without damaging the quality of service for cell edge users, namely—loose coverage, the solution provided by the present invention enables utilizing a metric of cells' overlap which has to exceed a threshold before a load balancing procedure may be initiated. In a UMTS (Universal Mobile Telecommunications System) for example, this metric is calculated as the Soft Handover Factor of the source cell and is used to indicate the influence of soft handover exerted on NodeB CE and to evaluate the subscriber resource utilization. If this Soft Handover factor is high enough, e.g. >1.6, then the load balancing procedure may be executed when this cell becomes congested.

Optimization of a cluster is described by steps 6-10 of the flow chart of FIG. 2. Using the cluster generated in steps 1-5, the LB algorithm then changes the radio parameters of the cluster to implement traffic offloading from the source cell to its less loaded neighbor(s) (step 6). Source cell and/or cluster performance is then monitored (step 7) and a determination is made (based on a performance threshold) whether to implement further changes to enable further offloading, to remain at last state, or to revert to the previous state (by canceling the parameter change). Steps 6-7 are then repeated until a performance threshold is achieved as determined by the rate of successful call initiations or any other applicable measure (step 8). If degradation in the quality of service occurs, system 50 reverts to the initial radio parameter settings (step 9). If the system cannot obtain KPIs for a predetermined time period, the status is reset and the cluster is reverted to its initial radio parameter settings (step 10).

The above description relates to optimization procedure of a generated cluster, by conducting several iterative steps of parameters' changes and KPI monitoring. However, it should be noted that the results obtained from optimizing such a cluster (termed herein as a reference cluster) can be applied to optimizing network performance of other loaded cells that can form a cluster similar to or identical to the currently optimized cluster.

For example, clusters in which the user radio map and radio resource utilization of the cells are substantially identical to that of the reference cluster can be generated (as described in steps 1-5) and then be optimized by simply applying the radio parameter changes that lead to successful optimization of the reference cluster. This negates the need for the time consuming iterative process described in steps 6-8 of FIG. 2. The user radio map and radio resource utilization of substantially identical clusters can be determined by comparing the overall distribution of quality metric such as Ec/Io and signal strength indicator such as RSCP.

In another example, in cases where the load balancing procedure is triggered repeatedly every day at same cell (FIG. 11), the parameter change information can be used to drive coverage and capacity optimization (CCO) in order to plan and implement (automatically) a constant change to the RF footprint of the source cell and of some of its neighbor cells by using a single step. In such cases, predetermined radio parameter changes can be applied to specific clusters at specific times of the day, or days of the week, without having to go through the iterative optimization steps as depicted in FIG. 2.

According to an embodiment of the present invention, the system provided can identify different cluster types and store information that relates to such clusters along with information on optimization and various radio parameters (e.g. user radio map and radio resource utilization) at a database.

The clusters can then be categorized according to one or more of the following:
(i) voice and data traffic being conveyed within the cluster;
(ii) traffic distribution between the cells that belong to the cluster;
(iii) radio conditions of each cell comprised the cluster and of the cluster in overall;
(iv) handover statistics and soft handover (SHO) factor between the cells that belong to the cluster;
(v) radio resources configuration of the cells included within the cluster;
(vi) radio hardware configuration of the cells included within the cluster; and
(vii) radio software parameter settings of the cells included within the cluster.

Once a specific cluster category is generated, it can be used later on e.g. in other SON applications.

The database may also be used to store details associated with the SON activity (for example, LB procedures activated per cell in the cluster) for each cluster configuration as well as performance metrics (KPIs) for each cluster. The system can also generate and store KPI performance trends for each cluster type, and create a predictive function that will enable predicting the KPI behavior of any cluster based on similar cluster types stored in the DB.

It will be appreciated by those skilled in the art that although load balancing according to the present invention can be applied to substantially enhance the performance of the network and thus to better accommodate the subscribers' demands, mobile operators today are facing an avalanche of demand which is driven in part by heavy mobile data demand. Thus, to further support this increase in data traffic, the solution provided by the present invention also offers a novel approach for enhancing policy control and resource management in cellular networks.

At present, operators utilize a node or nodes for policy and charging rule function (referred to herein as PCRF) and DPI techniques to restrict and manage data sessions regardless of radio resource consumption. In presently deployed 3G/4G mobile networks, data traffic is streamed from the user through the radio network (UTRAN/E-UTRAN) and packet core (PS-Core/EPC) to the Internet.

An IP multimedia subsystem (IMS) is a framework defined by 3GPP Standard to provide Internet and data services over cellular networks. Part of the IMS framework is the PCRF/PCEF which relates to two nodes configured to provide a platform for policy and charging rules function (PCRF) and policy and charging enforcement function (PCEF). The PCRF node determines, in real time and according to various considerations, a set of rules governing the way that data user traffic is handled. Such considerations normally include subscriber's subscription data (from HSS), QoS approved level, network load, operator service policy etc.

The main purpose of the PCRF is to enable management of the core network resources effectively in order to provide the best suited Quality of Service to users of data services.

Figure 3:
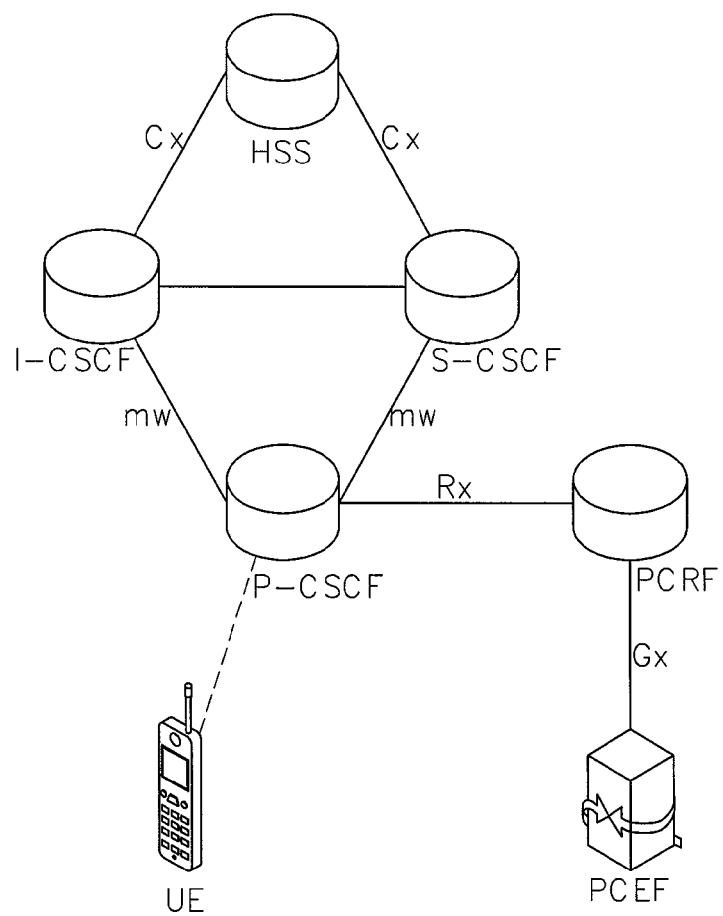
FIGS. 3-4 illustrate typical prior art architecture of PCRF/PCEF in an IMS framework.
Figure 4:
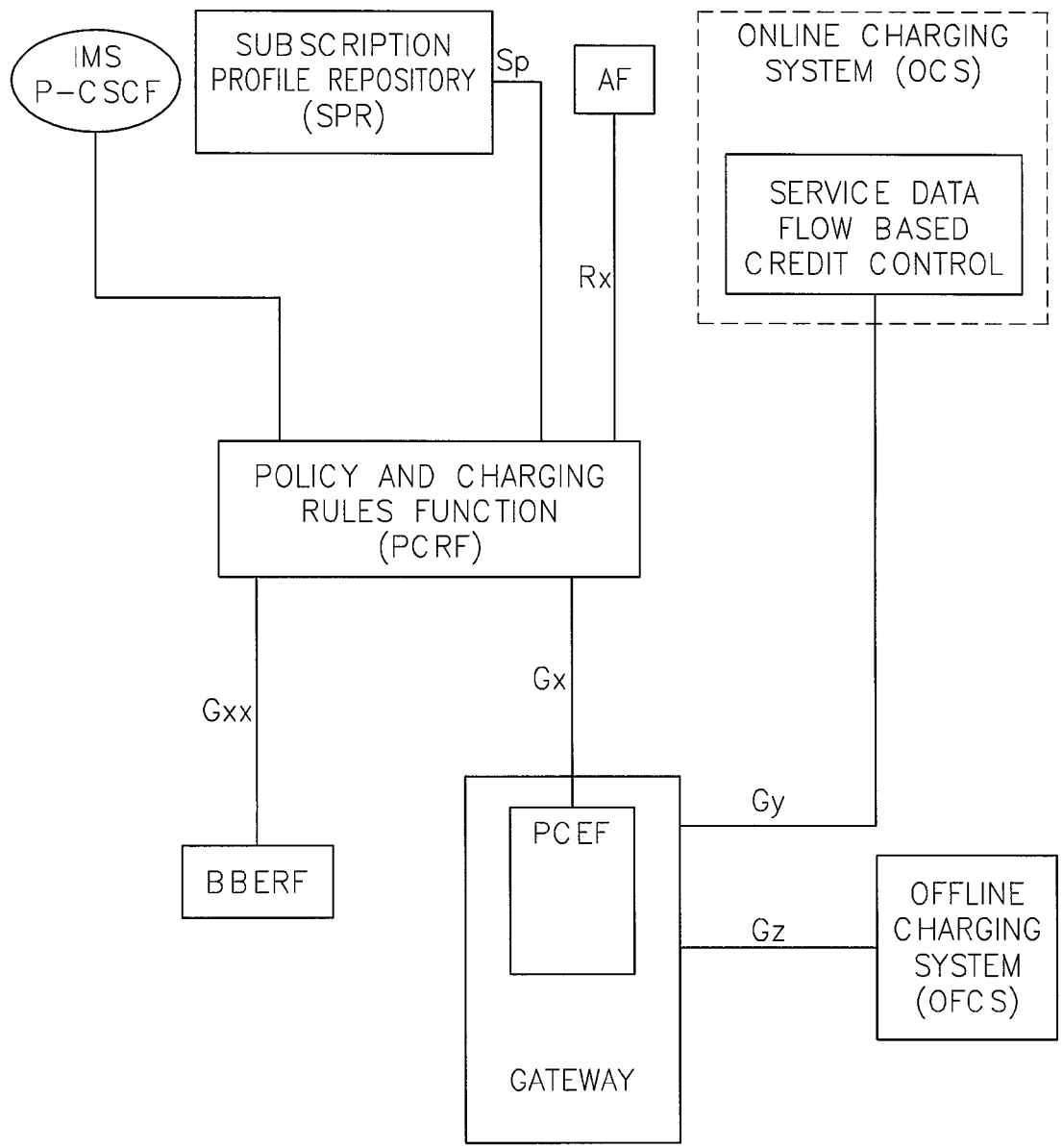

A typical architecture of PCRF/PCEF in IMS framework is illustrated in FIGS. 3 and 4. The PCEF node is designated to perform DPI (Deep Packet Inspection) into user traffic and enforce the rules created by the PCRF in real time. The PCRF node interacts with various network elements and uses several types of information, such as user's subscription records, allowed QoS levels for users and prioritization of services. The PCRF utilizes this information to create rules for enforcing bandwidth consumption limits per user (per PDP context) which are compatible with the user's contractual terms and with the operator's services' priorities, e.g. VoIP is prioritized over Streaming etc.

For example, service providers can use PCRF to charge subscribers based on their volume of usage of high-bandwidth applications, charge extra for QoS guarantees, restrict applications' usage while the user is roaming, or lower the bandwidth of wireless subscribers using heavy-bandwidth apps during peak usage times. PCRF can also be used to restrict user data traffic selectively to handle load situations in networks.

Currently the PCRF and PCEF nodes are not "aware" of cases in which overloaded cells are serving users with low bandwidth needs in low coverage areas. Such users may overload the radio resources of a cell which is designed to limit high bandwidth users that are near the cell.

The present invention provides a solution to such cases by managing specific data links that consume radio resources in order to reduce traffic loads from cells having high radio-resource utilization. This is achieved by providing the core bandwidth management systems (PCRF and PCEF) with information regarding users in specific radio-overloaded cells (e.g. with very limited remaining-radio resources), allowing such systems to apply specific policies to users who consume radio-resources for reducing the radio-resource loads on such cells.

Figure 5:
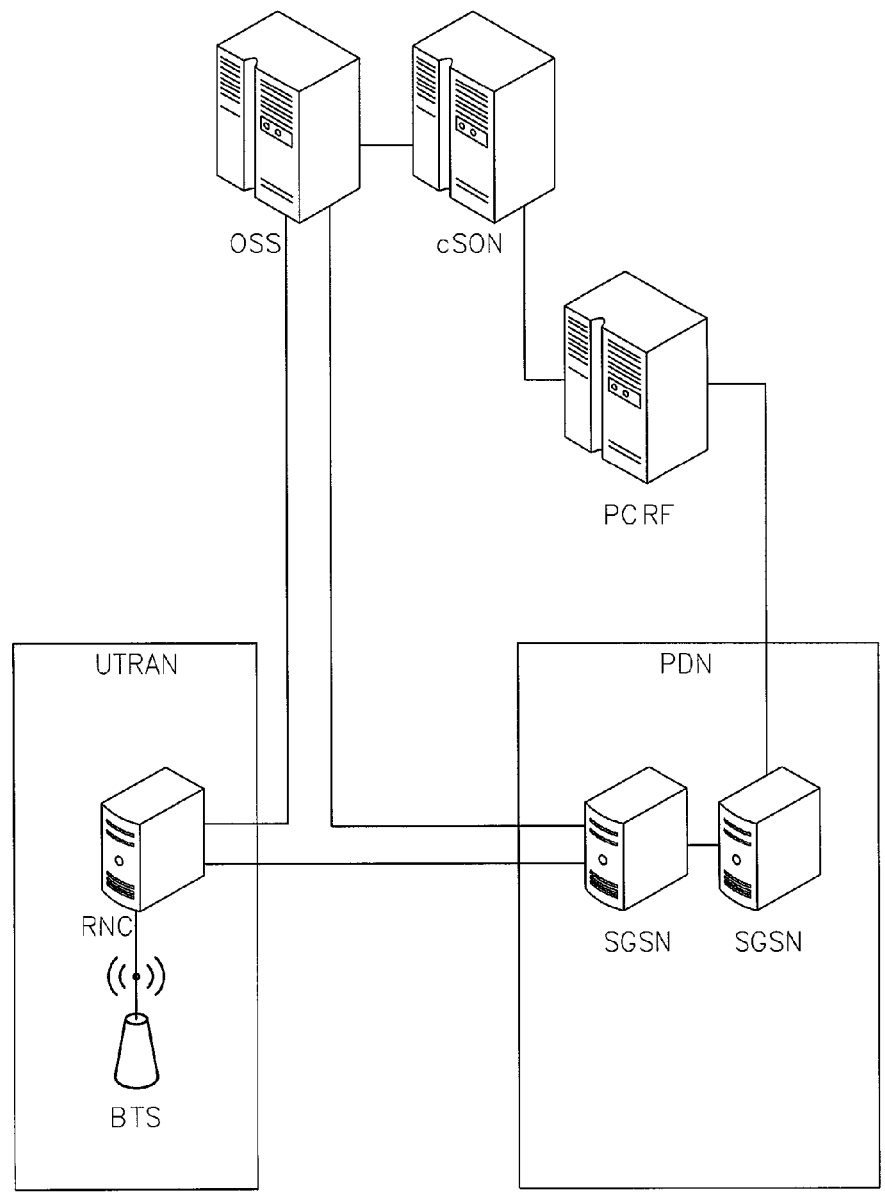
FIG. 5 illustrates one configuration according to an embodiment of the present invention which enables communication between the PCRF node and the cSON server of the present invention.

FIG. 5 illustrates one approach for enabling communication between the PCRF node and the cSON server of the present invention thus making the PCRF 'aware' of users in specific cells that have high radio-load information in the UTRAN. The information communicated from the cSON server to the PCRF node preferably includes cell level details of radio-resource loads for each and every cell, as well as radio resource consumption data for users present in each cell at any given moment. The PCRF node can use this information to selectively restrict specific users consuming high radio resources, to identify users consuming lower priority services, or users having a lower priority SLA (Service Level Agreement) in order to make sure that users of high priority SLAs are provided with the best data service.

To enable such optimization of data bandwidth provisioning, the cSON server may periodically provide the PCRF node (under near real time conditions) with UTRAN and UEs load information such as:

(i) list of all cells and their radio resource load conditions (power, channel elements, codes) and backhaul; and/or (ii) list of all users identified by IMSI (unique UE identifier).

For each user the information may include:

(1) To which cell is the user connected in the sampled time period (in cases where a user was identified in different cells during the sample time period, the identification of the latest cell is provided). Optionally, a "mobility filter" may be applied, by which, if during the sample time the user is active in a number of cells and this number is higher than a threshold, then user will be designated as a "high mobility user".

(2) The measured radio conditions for the user in the last serving-cell (average during relevant sample time).

(iii) cSON Load balancing activity status on all the cells (e.g. is it active at the cell, what action was performed, etc.).

The PCRF node then assess which cells are overloaded from data backhaul and data usage perspective (may be based also on information retrieved from other sources) and correlates this information with information provided by the cSON (as discussed above). For each loaded cell having also radio resource loaded, the PCRF node uses the provided subscriber potential load information in conjunction with other subscriber related information, to determine to which of the subscribers active in a certain cell, their activity will be restricted in that cell.

By applying selective restriction on a "per user" basis to the RR loaded cells, the actions taken by the PCRF node are more accurate and will ensure efficient usage of the UTRAN radio resources in compliance with the operator charging, service priorities and user SLAs according to their contracts.

Figure 6:
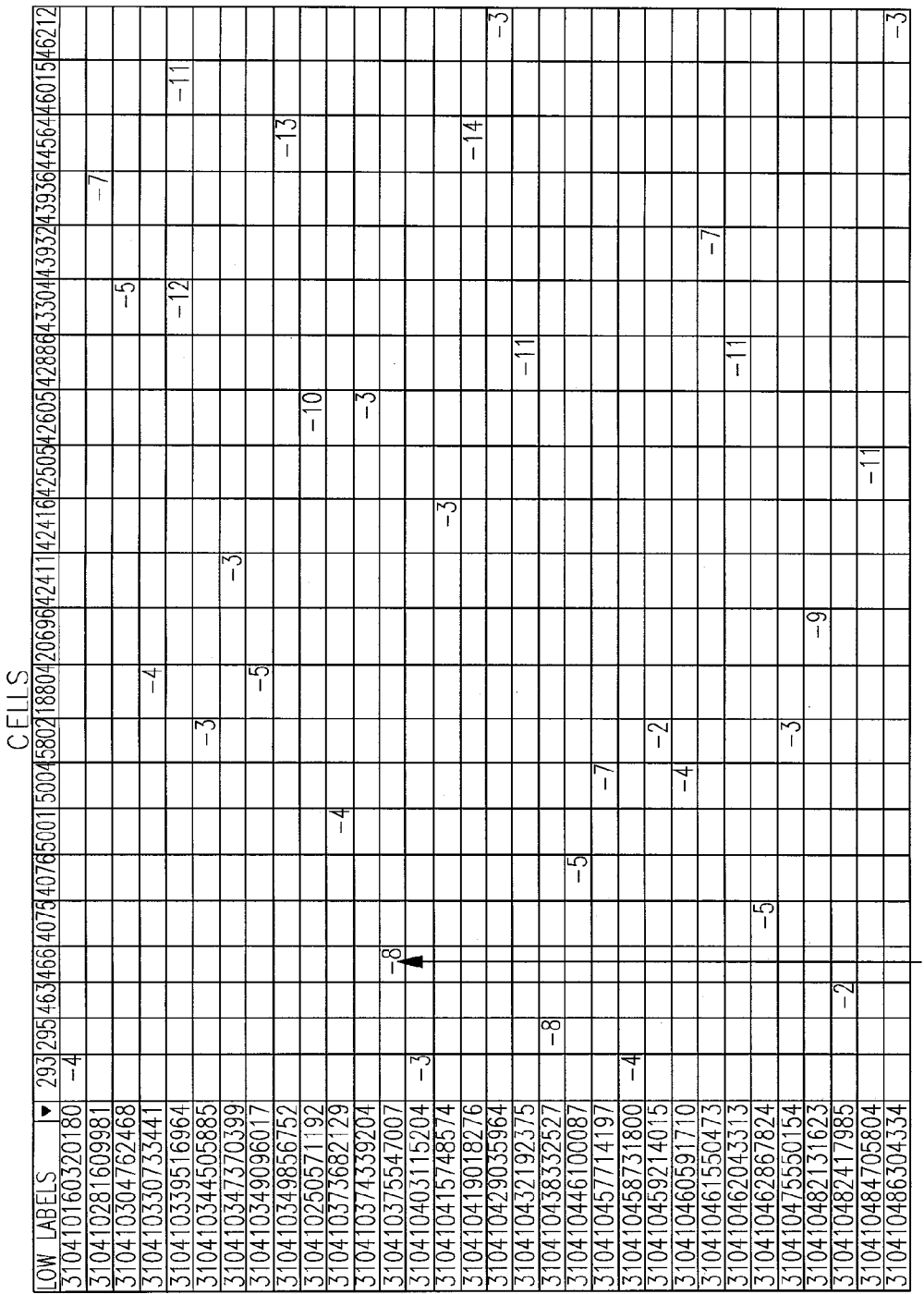
FIG. 6 illustrates results of user's radio quality sampled over 3 minutes and their distribution per cells in the radio network.

FIG. 6 illustrates user radio quality sampled over 3 minutes and their distribution per cells in the radio network. The average quality (Avg Quality) indicates the users' potential to consume high radio resources even while using low bit rate applications; the PCRF node will prioritize restriction of the activities of users with low Avg quality.

Additional objects, advantages, and novel features of the present invention will become apparent to one ordinarily skilled in the art upon examination of the following examples, which are not intended to be limiting.

EXAMPLES

Reference is now made to the following examples, which, together with the above description illustrate the invention in a non limiting fashion.

Example 1

Cluster Setup

In order to create a reference cluster for a congested cell, the system considers all the neighboring cells of that cell, e.g. cells that are defined by the OSS as being neighbors of this cell. Then, for each one of the neighbors, the system calculates a weighing function. The weighting function represents the intensity of the RF influence on users connected to the source cell, from a respective neighbor cell. For example, if for source cell A the weight of neighbor cell B is 10%, it means that in a given time interval (which is typically the weighing averaging window) 10% of the users which were connected to A, would experience B as the strongest neighbor or one of the top N strongest neighbors [where N depends on the active set size parameter which is defined in the RNC]. According to neighbor weights, the system selects the top weighted M (M=5 typically) neighboring cells, and relates to those cells as being the cluster neighbors for traffic offloading and for performance monitoring.

Example 2

Load Balancing

In this example, two clusters (specified in tables 1 and 2) were generated, monitored and optimized using the LB algorithm in accordance with an embodiment of the present invention.

Main Cell 103417060299 (Table 1) had a power load which exceeded the defined power load threshold. The system identified the top 5 neighbors of this main (source) cell according to their weight (Table 1). Additional filtering of the top 5 neighbors in the reference cluster was performed by selecting neighbors that can be used for offloading traffic from the source cell. Only neighboring cells which were not congested were selected for offloading traffic as shown in Table 1. The system then determined the action needed for each neighbor. The action in this case was to change the CPICH (pilot channel) transmission power from its current value by some offset in dB.

Once all radio parameter changes were applied by the system to neighbor cells, performance is monitored and a return (to initial settings) cause is logged. The same procedure was applied to the cluster of Table 2.

Cluster of Table 1 relates to return to initial settings following normal LB timeout (4 h). In the cluster of Table 2, there is an abnormal return as the system had identified missing KPI samples which led to its inability to monitor the performance effect of LB.

TABLE 1

| Main cell id | Load Trigger | Neighbor cell id | Neighbor weight | Selected for LB | Cause/Action | Revert cause |
|---|---|---|---|---|---|---|
| 103417060299 | 'load_power' | Main cell - 103417060299 | | Yes | level 1 | Feedback ended After 4 hours |
| | | 103417062599 | 5.3%; | No | CPICH 298 of neighbor is already at its maximum. Can't increase it | |
| | | 103417063198 | 14.9%; | No | Discarded neighbors - 'is_active' | |
| | | 103417061697 | 36.4%; | Yes | Changing CPICH of neighbor from 240 to 245 | |
| | | 103417061609 | 7.9%; | No | CPICH 305 of neighbor is already at its maximum. Can't increase it | |
| | | 103417060298 | 10.40% | No | CPICH 305 of neighbor is already at its maximum. Can't increase it | |

TABLE 2

| Main cell id | Load Trigger | Neighbor cell id | Neighbor weight | Selected for LB | Cause/Action | Revert cause |
|---|---|---|---|---|---|---|
| 103449005187 | 'load_power' | Main cell - 103449005187 | | Yes | level 1 + level 2 | "Cell had too many missing KPIs and will be reverted" - After 50 Min. |
| | | 103449033057 | 6.50% | No | Discarded neighbor - 'load_power' | |
| | | 103449032028 | 5.10% | Yes | Changing CPICH of neighbor from 300 to 305 | |
| | | 103449002268 | 5.30% | Yes | Changing CPICH of neighbor from 310 to 312 | |
| | | 103449031459 | 6.60% | No | CPICH 310 of neighbor is already at its maximum. Can't increase it | |
| | | 103449031398 | 11.80% | Yes | Changing CPICH of neighbor from 281 to 286 | |
| | | 103449032029 | 16.80% | No | Discarded neighbor - 'load_power' | |
| | | 103449005188 | 16.70% | No | CPICH 316 of neighbor is already at its maximum. Can't increase it | |
| | | 103449030707 | 5.80% | No | Discarded neighbor - 'load_power', 'is_active' | |

FIGS. 7-10 illustrate the effect of load balancing using the system of the present invention solution on KPIs and load metrics (as derived from OSS) of the cells described in Tables 1 and 2 above. Numbers on the right of the Figure note the cell ID which corresponds to the cell ID in the Tables.

Figure 7:
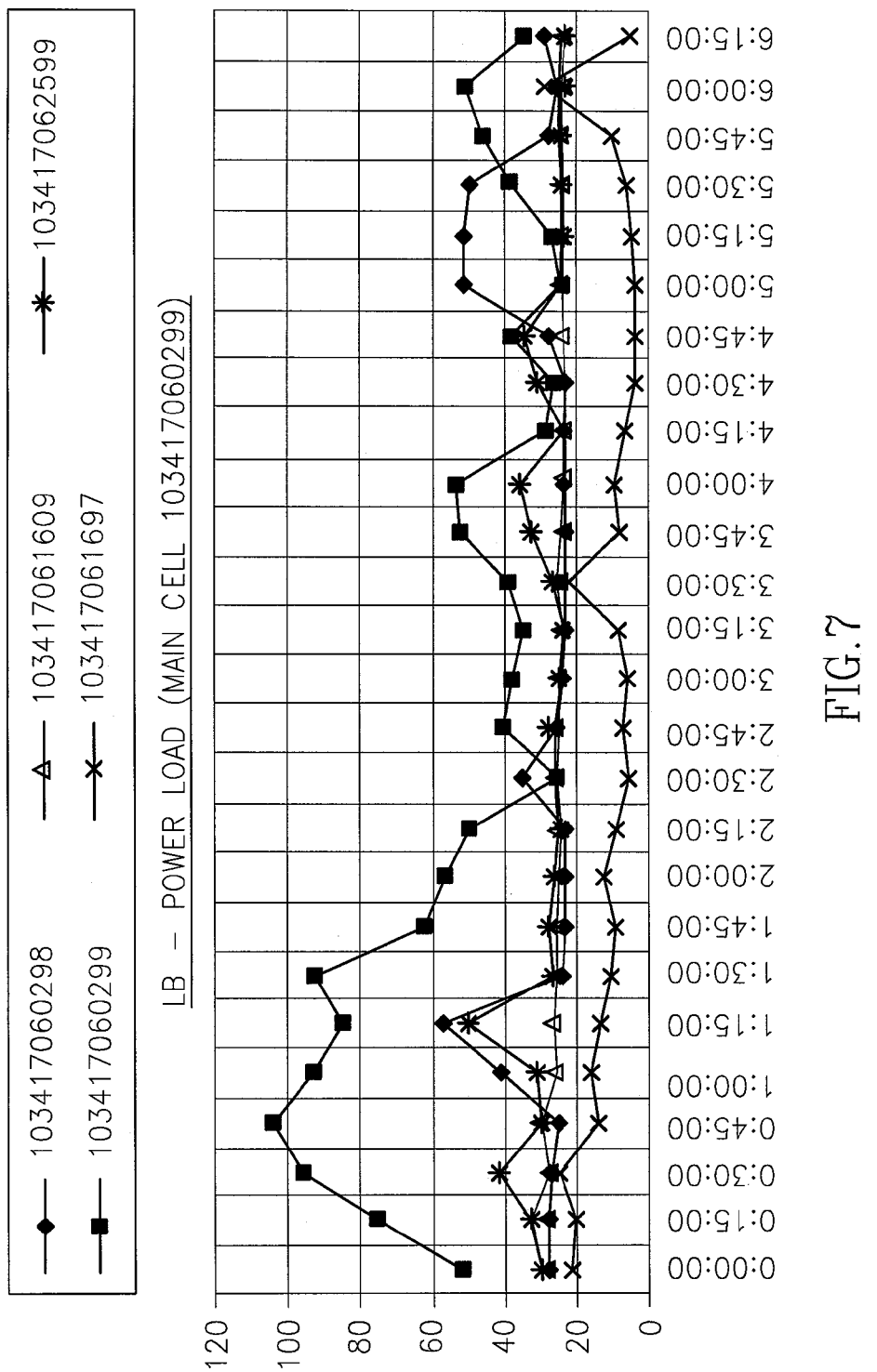
FIG. 7-10 illustrate the effect of load balancing as practiced using the solution of the present invention on radio resource load and relevant KPI trends.

FIG. 7 illustrates the power load of the main cell of the cluster and its neighbors (presented in Table 1). As shown in this Figure, applying the LB algorithm in accordance with the solution provided by the present invention starting at 1:30:00, resulted in a dramatic decrease of traffic load in the main cell of main (source) cell '299, without overloading the neighbor cells.

Figure 8:
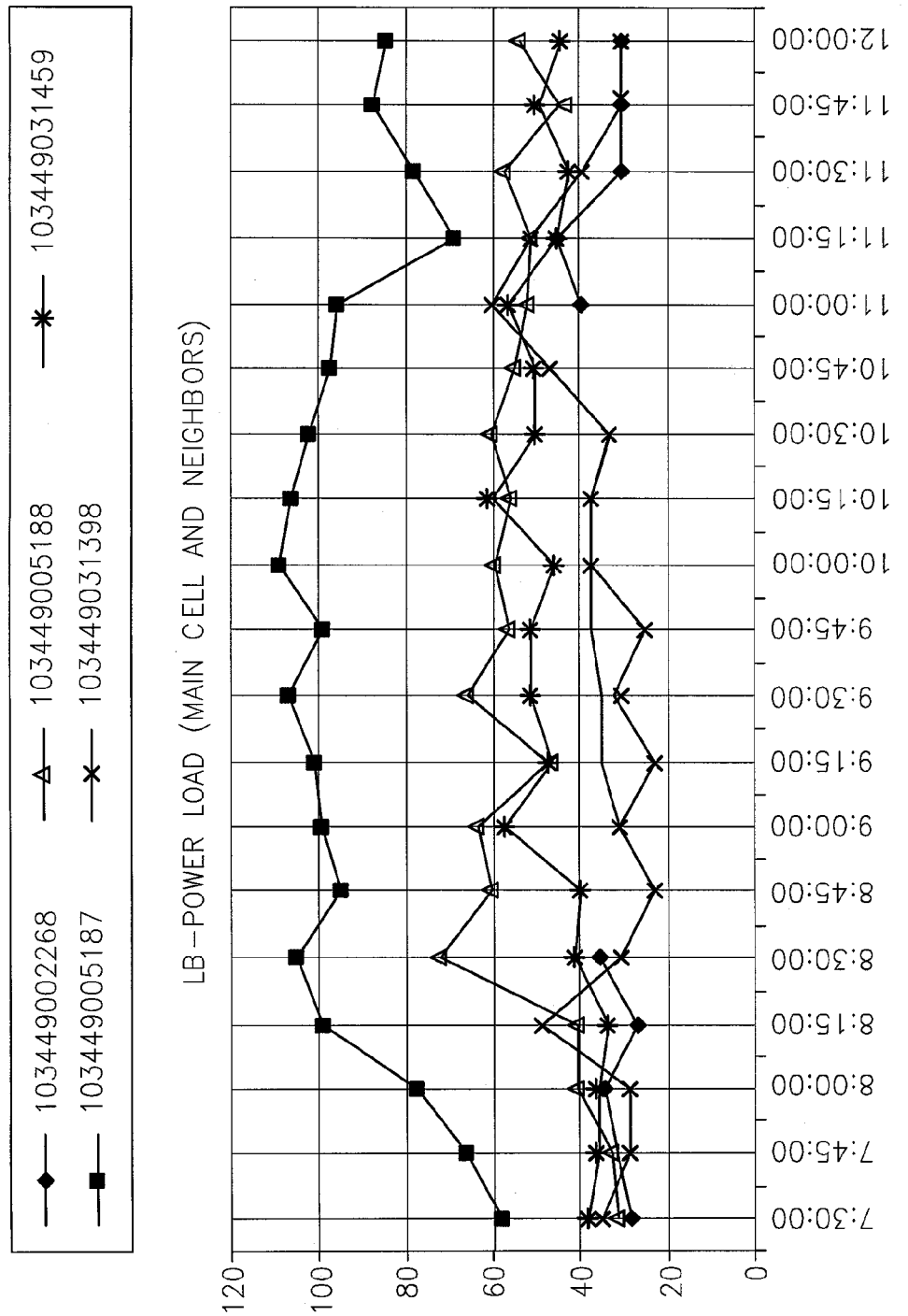

FIG. 8 illustrates the power load of the main cell of the cluster and its neighbors (Table 2 without discarded neighbors) showing that application of the LB algorithm of the present invention solution resulted in a load drop. However, due to the fact that KPIs could not be retrieved for the main cell of this cluster following time point 11:15:00, the system stopped the LB application and reverted to its initial settings.

Figure 9:
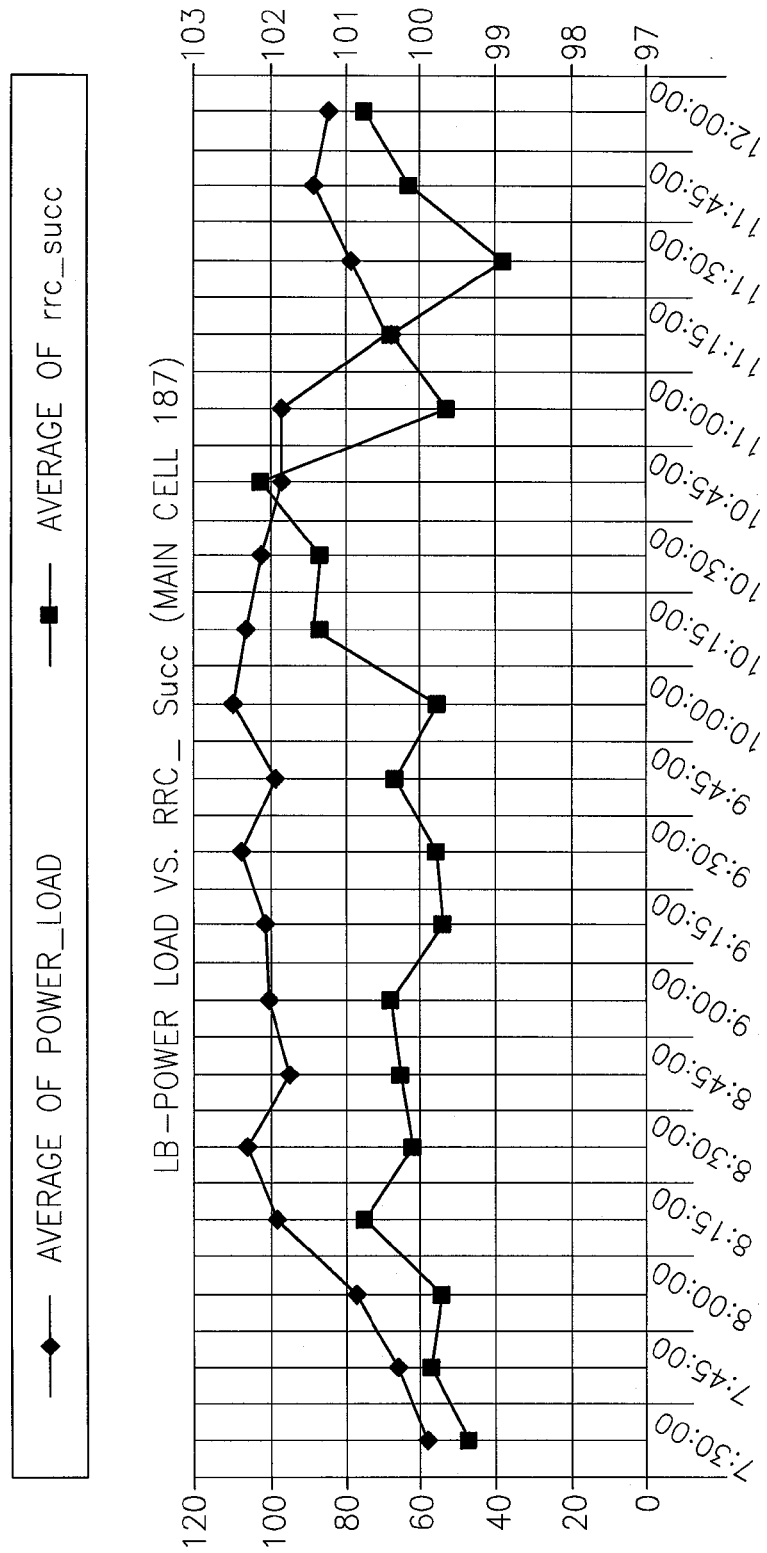

FIG. 9 illustrates power load vs. RRC_Succ (Accessibility KPIs—indicates rate of successful call initiation) for main cell 187 (Table 2). As illustrated in this Figure, application of the LB algorithm of the present invention resulted in power load decrease and a significant increase in RRC_Succ. As was noted for FIG. 8, KPIs for this source cell could not be retrieved beyond time point 11:15:00 and as such the system reverted to its initial settings.

Figure 10:
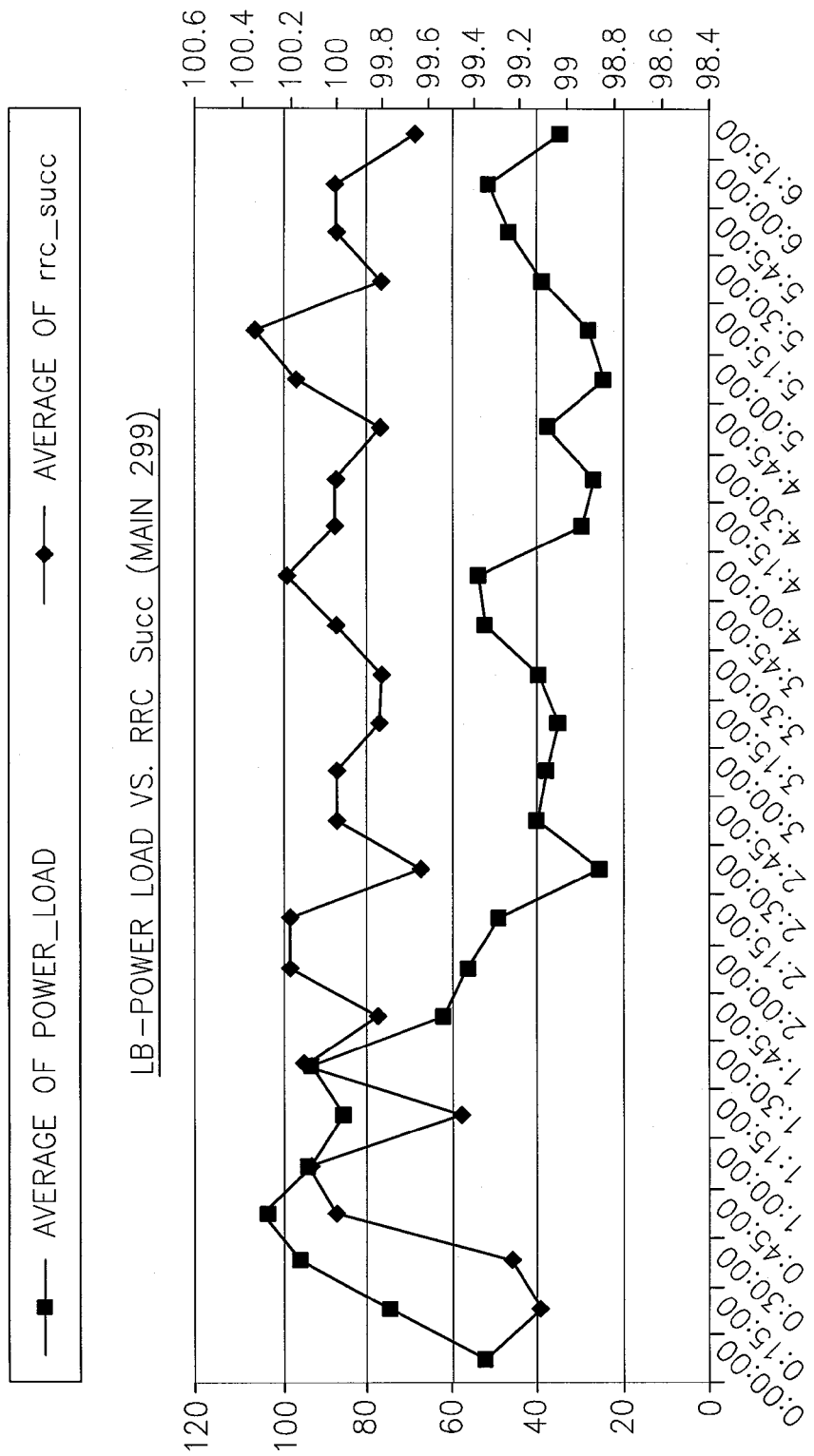

FIG. 10 illustrates the same monitoring for main cell 299 of Table 1. As illustrated in this Figure, activation of LB algorithm (at time point 1:30:00) resulted in a decrease in power load and increase in RRC_Succ.

Example 3

Load Balancing-Reduced Hardware Load

Figure 11:
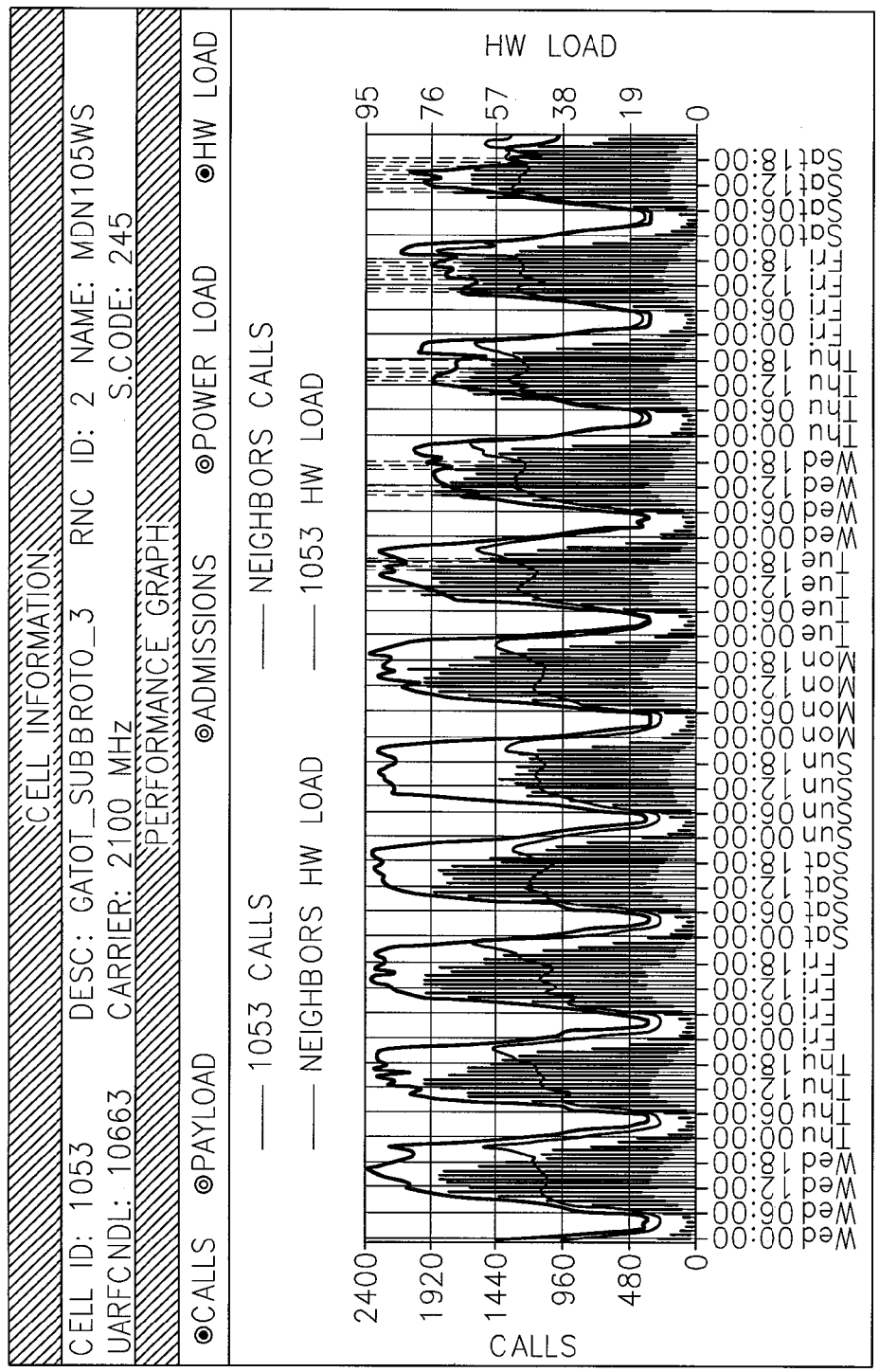
FIG. 11 illustrates daily hardware load patterns for a specific source cell of a cluster showing the effect of activating the load balancing (LB) algorithm in the last four days of monitoring (arrows).

FIG. 11 illustrates the effect of applying the LB algorithm on the same cluster at specific time points during the day, the last 4 peaks in the graph represent days in which the present load balancing algorithm was utilized to reduce load of a main cell. In this case LB action can be permanent, subject to the rules and conditions of the CCO (Coverage and Capacity Optimization) platform. This is due to the fact that LB changes are consistent at a specific time point each day (busy hour) and as such, the same radio parameters can be applied at these time points.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A communication apparatus for predicting effects of changes in at least one radio network parameter on a cellular network which comprises one or more processors adapted to:
    (a) select a first cell in a cellular network;
    (b) select from among a first plurality of cells being neighbors of said first cell, a second plurality of neighboring cells thereby defining a reference cluster that includes said first cell and said second plurality of cells, wherein cells are selected from among the first plurality of cells to belong to the second plurality of cells if at least one of:
        (i) a number of handovers carried out from said first cell to each of the selected second plurality of cells within a pre-defined period of time, divided by a total number of handovers carried out from said first cell to all of its neighboring cells belonging to the first plurality of cells within that pre-defined period of time exceeds a pre-defined threshold; and
        (ii) a geographical distance extending between said first cell and each of the selected second plurality of cells is equal to or less than a predetermined value; and
    (c) using said reference cluster to predict an effect of carrying out one or more changes in at least one radio network parameter on at least one network performance indicator of said reference cluster, and based on said prediction, establishing an expected impact of the one or more changes in the at least one radio network parameter on a cellular network performance.

2. The communication apparatus of claim 1, wherein said at least one radio network parameter being changed is off-loading of communication traffic from said first cell to at least one cell from among said second plurality of cells.

3. The communication apparatus of claim 1, wherein said at least one radio network parameter is a member of a group that consists of: antenna tilt, pilot power usage and/or handover hysteresis offset between said first cell and said second plurality of cells.

4. The communication apparatus of claim 1, wherein said first cell is characterized by having radio resource utilization that exceeds a predetermined threshold.

5. The communication apparatus of claim 1, wherein the one or more processors are adapted to repeat (c) until the expected impact on the cellular network performance, of the one or more changes in the at least one radio network parameter, is maximized.

6. The communication apparatus of claim 5, wherein said at least one radio network parameter change leading to maximization of the expected impact on said cellular network performance is applied for optimizing cellular network performance associated with a second cluster.

7. The communication apparatus of claim 1, for use in a process of balancing a load of the cellular network, wherein the one or more processors are further adapted to:
    (I) use said reference cluster to determine an effect of carrying out one or more changes in at least one radio network parameter on at least one network performance indicator of said reference cluster, and based on said determination, derive traffic load optimization rules for said cellular network; and
    (II) obtain at least one network performance indicator which is associated with the cellular network and optimize load performance of said cellular network according to said at least one network performance indicator and said load optimization rules.

8. A method for predicting effects of changes in at least one radio network parameter on a cellular network, wherein said method comprises the steps of:
    (a) selecting a first cell in a cellular network;
    (b) selecting from among a first plurality of cells being neighbors of said first cell, a second plurality of neighboring cells and defining a reference cluster that includes said first cell and said second plurality of cells, wherein cells are selected from among the first plurality of cells to belong to the second plurality of cells if at least one of:
        (i) a number of handovers carried out from said first cell to each of the selected second plurality of cells within a pre-defined period of time, divided by a total number of handovers carried out from said first cell to all of its neighboring cells belonging to the first plurality of cells within that pre-defined period of time exceeds a pre-defined threshold; and
        (ii) a geographical distance extending between said first cell and each of the selected second plurality of cells is equal to or less than a predetermined value; and
    (c) using said reference cluster to predict an effect of carrying out one or more changes in at least one radio network parameter on at least one network performance indicator of said reference cluster, and based on said determination, establishing an expected impact of the one or more changes in the at least one radio network parameter on a cellular network performance.

9. The method of claim 8 for use in a process of balancing traffic loads in said cellular network, wherein the method further comprising the steps of:
    (I) using said reference cluster to determine an effect of carrying out one or more changes in at least one radio network parameter on at least one network performance indicator of said reference cluster, and based on said determination, derive traffic load optimization rules for said cellular network; and
    (II) obtaining at least one network performance indicator which is associated with the cellular network and optimize load performance of said cellular network according to said at least one network performance indicator and said load optimization rules.

10. The method of claim 9, for use in managing data radio resources of a cellular network, wherein said method further comprises:

(a) retrieving information that relates to:
 (i) radio resource load conditions of a cell; and
 (ii) radio conditions for each user of that cell;
(b) identifying data-overloaded cells and correlating their associated information with that retrieved in (a); and
(c) ranking users of these cells according to their impact on radio load of the cell.

11. The method of claim 10, further comprising:
(d) limiting data provisioning to specific users of said cell based on (c) and on subscriber information associated with said specific users.

12. The method of claim 8, wherein said at least one radio network parameter being changed is offloading of communication traffic from said first cell to at least one cell from among said second plurality of cells.

13. The method of claim 8, wherein said at least one radio network parameter is a member of a group that consists of: antenna tilt, pilot power usage and/or handover hysteresis offset between said first cell and said second plurality of cells.

14. The method of claim 8, further comprising:
repeating (c) until the expected impact on the cellular network performance, of the one or more changes in the at least one radio network parameter, is maximized.

15. The method of claim 14, wherein said at least one radio network parameter change leading to maximization of the expected impact on said cellular network performance is applied for optimizing cellular network performance associated with a second cluster.

16. At least one non-transitory computer-readable medium encoded with instructions that, when executed by a processor, perform:
(a) selecting a first cell in a cellular network;
(b) selecting from among a first plurality of cells being neighbors of said first cell, a second plurality of neighboring cells and defining a reference cluster that includes said first cell and said second plurality of cells, wherein cells are selected from among the first plurality of cells to belong to the second plurality of cells if at least one of:
 (i) a number of handovers carried out from said first cell to each of the selected second plurality of cells within a pre-defined period of time, divided by a total number of handovers carried out from said first cell to all of its neighboring cells belonging to the first plurality of cells within that pre-defined period of time exceeds a pre-defined threshold; and
 (ii) a geographical distance extending between said first cell and each of the selected second plurality of cells is equal to or less than a predetermined value; and
(c) using said reference cluster to predict an effect of carrying out one or more changes in at least one radio network parameter on at least one network performance indicator of said reference cluster, and based on said determination, establishing an expected impact of the one or more changes in the at least one radio network parameter on a cellular network performance.

17. The non-transitory computer-readable medium of claim 16, wherein said at least one radio network parameter being changed is offloading of communication traffic from said first cell to at least one cell from among said second plurality of cells.

18. The non-transitory computer-readable medium of claim 16, wherein said at least one radio network parameter is a member of a group that consists of: antenna tilt, pilot power usage and/or handover hysteresis offset between said first cell and said second plurality of cells.

19. The non-transitory computer-readable medium of claim 16, further comprising instructions that, when executed by the processor, perform:
repeating (c) until the expected impact on the cellular network performance, of the one or more changes in the at least one radio network parameter, is maximized.

20. The non-transitory computer-readable medium of claim 19, wherein said at least one radio network parameter change leading to maximization of the expected impact on said cellular network performance is applied for optimizing cellular network performance associated with a second cluster.

* * * * *